United States Patent [19]

Kuhl

[11] Patent Number: 4,709,713

[45] Date of Patent: Dec. 1, 1987

[54] APPARATUS FOR CONVEYING AND WASHING MEANS THEREFOR

[76] Inventor: Henry Y. Kuhl, Kuhl Rd., P.O. Box 26, Flemington, N.J. 08822

[21] Appl. No.: 820,862

[22] Filed: Jan. 21, 1986

[51] Int. Cl.⁴ .............................................. B08B 3/02
[52] U.S. Cl. .................................... 134/72; 134/131; 134/182; 198/848
[58] Field of Search .................. 134/72, 95, 124, 131, 134/137, 140, 182, 183, 199; 198/848

[56] References Cited

U.S. PATENT DOCUMENTS

| | | | |
|---|---|---|---|
| 1,513,080 | 10/1924 | Young | 198/848 |
| 1,932,827 | 10/1933 | Morris et al. | 134/72 |
| 1,989,562 | 1/1935 | Smith | 134/131 X |
| 2,322,417 | 6/1943 | Christian | 134/72 X |
| 2,651,312 | 9/1953 | McBeth | 134/122 R |
| 2,710,125 | 6/1955 | Brown | 198/848 X |
| 3,076,730 | 2/1963 | Nolte | 134/72 X |
| 3,139,890 | 7/1964 | Moran | 134/72 X |
| 3,448,678 | 6/1969 | Burstein | 198/848 X |
| 3,991,876 | 11/1976 | Schmidt, Sr. et al. | 198/848 X |

Primary Examiner—Harvey C. Hornsby
Assistant Examiner—Frankie L. Stinson
Attorney, Agent, or Firm—Sperry, Zoda & Kane

[57] ABSTRACT

An apparatus for washing a conveyor belt and any articles which may be positioned thereon including a plurality of nozzles including upwardly and downwardly directed nozzles and forwardly and rearwardly directed nozzles wherein the surrounded cleaning is achievable by use of the deflectors integral with respect to the nozzles. The wash station includes manifolds for communicating the cleaning solution from the pump to the nozzles. A filter as well as a tank for gathering of spent cleaning solution is included along with a return pipe for providing the filtered solution to the pipe for reprocessing. A drying station is included having a blower and manifolding means for dispensing the air for drying of articles on the conveyor belt or drying of the conveyor belt itself. The present invention is particularly usable with wire conveyor belts utilizing interlocking means for maintaining laterally extending straight sections in spatially disposed relationship with respect to one another.

7 Claims, 4 Drawing Figures

APPARATUS FOR CONVEYING AND WASHING MEANS THEREFOR

BACKGROUND OF THE INVENTION

1. Field of the Invention

The present invention deals with the field of devices for washing of conveying belts and articles traveling upon conveying belts. In particular the present invention is usable for the pre-cleaning of eggs immediately before they have been removed from poultry houses.

Eggs are carried from cages to the end of a poultry house in the configurations wherein they are deposited on a conveyor for gathering with the eggs of other poultry houses. This conveyor tends to get extremely dirty since the eggs are covered with broken eggs, eggshells, and yolk, as well as chicken excrement, feathers, blood and feed. This debris tends to gather upon the wire type conveyor belts utilized for carrying these eggs and these belts are extremely difficult to clean. The present invention provides a system for cleaning of this belt which is a problem which has heretofore not been directly addressed.

Eggs are normally washed at a more distant location adjacent to the accumulating conveyors, however, by that time dried yolk and dried blood tends to become extremely difficult to remove. Therefore the present invention provides a unique system for cleaning of the initial gathering conveyor as well as providing an initial cleaning of the eggs themselves. Since the eggs are randomly positioned upon the conveyor, a complete cleaning of the eggs is most difficult. However, by an initial pre-cleaning as disclosed in the present invention, most loose blood, yolk and other debris can be effectively removed.

2. Description of the Prior Art

Conventional egg washing systems utilize individual containers or egg receiving recesses for holding individual eggs during the cleaning operation. Spraying is normally done directly downwardly onto the conveyor thereby washing the entire egg. The present invention, however, deals with the problem of eggs prior to being placed within individual egg receiving recesses on a conveyor. Immediately before being removed from the poultry houses, eggs are randomly positioned upon conveyors and thereby full and complete washing is not yet possible. With the present invention, the pre-cleaning of the eggs is achieved while simultaneously the convoluted wire conveyor belt can also be cleaned. This wire conveyor belt is extremely difficult to wash due to the many angles and arcs through which the wires must extend in order to form a belt. With the present invention, an upper section of washing nozzles and a lower section of washing nozzles achieves a full and complete washing of the belt and an effective pre-cleaning of eggs or articles carried on the belt by having the nozzles both above and below the conveyor belt. Prior art devices do not consider the washing of eggs or articles normally when randomly positioned upon a conveyor belt and thereby do not normally utilize a lower bank of washing nozzles. Also prior art devices do not include deflector means for cleaning the front and back edge of eggs or conveyor belt sections by directly upwardly or downwardly directed nozzles as is achievable in the present invention.

SUMMARY OF THE INVENTION

The present invention provides an apparatus for washing of conveying belts and articles carried thereon wherein the conveying belts can comprise a plurality of interlocking wire members. These individual wire members are interlocked with respect to one another and yet are pivotally movable with respect to one another. Each wire section may include a central section extending approximately straight laterally across the conveyor and perpendicular with respect to the direction of movement of the conveyor. Interlocking means are provided at one or both ends of each central section in such a manner as to movably grip the adjacent wire members by forming a loop therearound and thereby maintain the spatial distance between the central sections of the adjacent wire members of a distance of approximately one inch, and yet allowing pivotal movement therebetween.

The present invention includes a wash station for cleaning of such conveyor belt systems and possibly also of articles randomly positioned thereon which includes a wash housing which encloses a portion of the conveyor belt length. This wash housing defines a washing chamber therein for enclosing and gathering cleaning solution sprayed toward the conveyor belt from above and below. The wash housing means defines an outlet means in the lower section thereof to allow used cleaning solution to exit from the wash housing and be gathered. A pump means is included for pumping of the cleaning solution into intake manifolds positioned within the washing chamber which direct the cleaning solution adjacent to the conveying belt.

The intake manifold preferably includes an upper manifold section extending across the upper surface of the conveyor belt and a lower manifold section extending across the lower surface of the conveyor belt in such a manner as to effectively surround the conveying belt traveling therebetween, and a plurality of upper nozzles are preferably mounted within the upper manifold section and extend downwardly therefrom in order to dispense cleaning solution in a downwardly direction onto the conveying belt and the articles which may be randomly positioned thereon.

Similarly, a plurality of lower nozzles are preferably mounted within the lower manifold section and extend upwardly such as to dispense cleaning solution in an upwardly direction onto the conveying belt and the lower portions of any articles which may be positioned thereon. A drive means is included for powering the pump and a tank means is positioned immediately below the cleaning solution outlet defined in the wash housing. This tank means is in fluid flow communication with respect to a return line which supplies cleaning liquid to the pump for being returned to the nozzle. Preferably a filter means is included between the solution outlet and the tank means in order to remove debris and other contaminants from the cleaning solution prior to being repumped through the dispensing nozzle.

A support means is also preferably included within the wash housing which supports and guides the conveying belt while it travels through the wash station. This support means should be open to an extent to allow solution from the lower nozzles to be blasted upwardly between the individual support means. Preferably these support means will take the form of vertically extending plates presenting upper edges which carry the conveyor belt and yet allow cleaning solution to be blown upwardly therebetween.

A drying station is also included positioned downstream from the wash station which encloses the conveying belt traveling therethrough. This drying station should include a drying housing with a blower positioned immediately adjacent thereto. The blower will provide pressurized air to pass through an air manifold to an air dispensing means which is positioned within the drying housing. This air dispensing will blow the air, which is not necessarily heated, onto the conveying means and any articles positioned thereon for drying thereof.

The present invention preferably includes a grouping of the upper nozzles into a first nozzle section and a second nozzle section with one nozzle section including deflectors which although urging the fluid downwardly also urges the fluid in the downstream direction with respect to the direction of movement of the conveying belt. The other section of upper nozzles should urge the cleaning solution downwardly and upstream with respect to the direction of movement of the conveyor. In this manner, effective cleaning of the belt top and sides is facilitated. Furthermore, the lower nozzles should also be divided into two sections including deflectors for cleaning the bottom and front of articles and the conveying means by being directed upstream as well as a grouping of nozzles for being directed downstream in order to clean the bottom and back of articles and portions of the conveying belt traveling thereby.

It is an object of the present invention to provide an apparatus for washing of interlocking wire conveying belts.

It is an object of the present invention to provide an apparatus for washing of eggs immediately before removal of the eggs from a poultry house.

It is an object of the present invention to provide an apparatus for washing of egg gathering conveying belts and for pre-washing of the eggs themselves.

It is an object of the present invention to provide an apparatus for washing including a plurality of upper nozzles which generally spray cleaning solution downwardly but also include a specific bank of nozzles having solution deflected upstream and another bank of nozzles having solution deflected downstream.

It is an object of the present invention to provide a lower grouping of washing nozzles divided into two sections with one group of lower nozzles urging cleaning solution upwardly and downstream, and the other group of nozzles urging the solution upwardly and upstream.

It is an object of the present invention to provide a means for washing and drying of article carrying wire conveyors.

It is an object of the present invention to provide an apparatus for washing conveying means and articles carried thereon which includes a recirculating washing solution 10.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The present invention provides a washing means for an apparatus for carrying or conveying eggs or other articles. The washing means includes a washing station particularly usable as a pre-washing step for the articles carried upon the conveying means.

Figure 4:
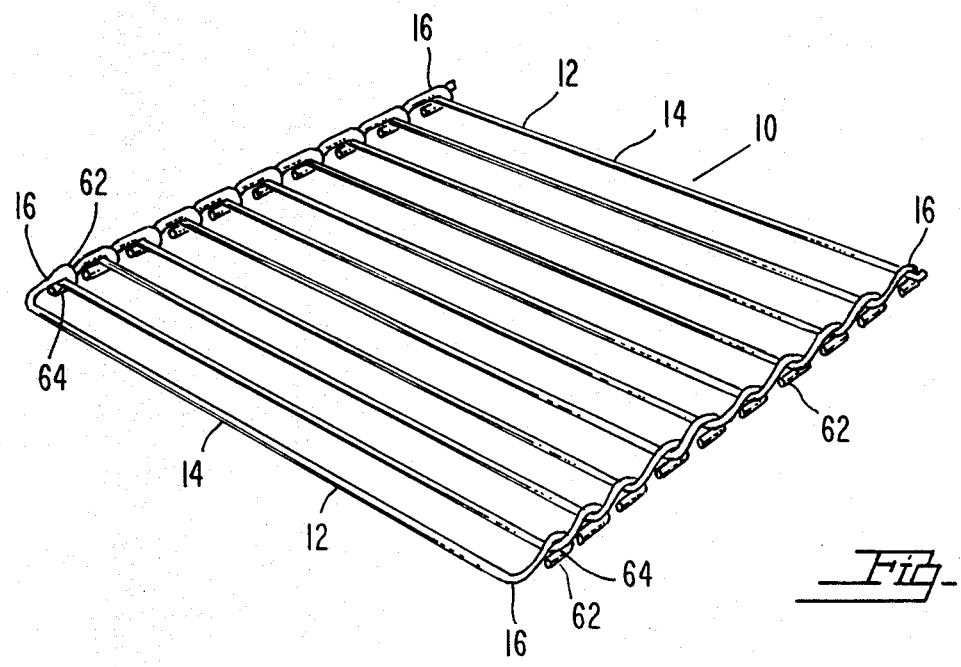
FIG. 4 is a perspective view of the embodiment of the conveying belt means utilized in the present invention.

A conveying belt 10 as best shown in FIG. 4 may be formed of a plurality of wire members 12 with laterally extending central sections 14 being generally parallel with respect to one another. Each wire member 12 is interlocked with respect to an adjacent member by an interlocking end means 16. As shown in FIG. 4, these end means form wire loops 62 which define openings 64 therein through which a portion of an adjacent wire member 12 may extend. With this configuration, the individual central sections 14 of wire members 12 are maintained in a parallel relationship with respect to one another.

The present invention is particularly useful for carrying articles 11 such as eggs and with such systems, the spacing between the central sections 14 and the individual wires 12 is maintained less than the smallest possible diametric dimension of an egg.

The present invention is particularly usable for washing and drying of the egg conveying belt which is used to carry eggs from poultry houses. These conveying belts are normally not washed and tend to become extremely dirty due to the great amount of debris and contaminates which are deposited thereon in addition to the eggs. Such contaminants include feathers, chicken excrement, blood, broken eggshells, egg yolks, and chicken feed. The present invention provides a novel means for cleaning of these conveying belts and for also simultaneously providing a pre-washing step for the eggs being carried thereon.

The conveying belts used for carrying eggs from poultry houses are normally of the configuration described above and shown in FIG. 4. The wire loops 62 and interlocking end means 16 form a number of convoluted angles of wire which tend to accumulated excessive amounts of various types of dirt. The present invention provides a novel means for directing cleaning solution in order to clean the convoluted structure. This convolution is required because the conveying belt 10 must be maintained in a pivotable condition such that it can follow the drive sprockets or drive chains, and so forth, that is used in the ongoing systems. The present invention provides that cleaning system.

The present invention further includes a wash station 18 having a wash housing 20 which defines therein a generally enclosed washing chamber 22. It is within this washing chamber that the full washing step is performed.

Cleaning solution is pumped by a pump means 24 through an intake manifold means 26 for delivery to wash housing 20. Pump means 24 delivers cleaning solution into an upper manifold section 28 which extends generally across the upper surface of conveying belt 10. Upper nozzles 32 are mounted within the intake manifold means 26 and are directed downwardly to release cleaning solution downwardly. The upper nozzles 32 and the upper manifold 28 are in fluid flow communication with respect to one another.

In a similar manner, a lower manifold section 30 is in fluid flow communication with respect to the pump means 28 to receive cleaning solution therefrom. A plurality of lower nozzles 34 are mounted within the lower manifold section 30 which extend across the bottom surface of conveying belt 10 and the lower nozzles 34 extend upwardly therefrom in order to dispense cleaning solution upwardly onto the bottom of the conveying belt means 10 and any articles 11 being carried thereon.

A drive means 36 is provided for powering of pump means 24. Also, a tank means 38 is included within the wash station 18 positioned immediately therebelow. An outlet means 74 is defined in the lower area of washing chamber 22 to allow the spent cleaning solution to be drained therethrough. Immediately below outlet means 74 preferably is positioned a filter 42 for filtering of the cleaning solution prior to it returning to tank means 38. Once within tank means 38, the cleaning solution is available for passage through return line 40 for repumping through the system. Return line 40 is in fluid flow communication with tank means 38 as well as with respect to pump means 34.

To maintain the conveying belt in the proper chosen location within wash housing 20, a support means 44 is positioned therein. This support means 44 preferably takes the form of a plurality of vertically extending plates 46 which present upper edges 48 for directly abutting the lower portions of conveying belt 10 and in particular of a wire type conveying belt utilizing wire members 12. Individual support means 44 define open channels 50 therebetween such that cleaning solution dispensed through lower nozzles 44 in an upwardly directed manner can easily contact the entire lower surface of conveying belt 10 and any articles 11 which may be carried thereon.

A drying station 52 is positioned immediately downstream from wash station 18 and includes a drying housing means 54 which housing extends about and generally encloses the conveying belt 10 which will be wet as it enters the housing means having so immediately recently been washed within wash station 18. A blower means 56 is positioned adjacent to drying station 52 in such a manner as to provide pressurized air through an air manifold means 58 for dispensing directly onto the conveying belt 10 and any articles 11 positioned thereon by an air dispensing means 60. This blowing air need not normally be heated which saves considerable energy. Normally, a significant amount of the water on the conveying belt can actually be blown off thereby greatly decreasing the time required for drying by evaporation.

Figure 1:
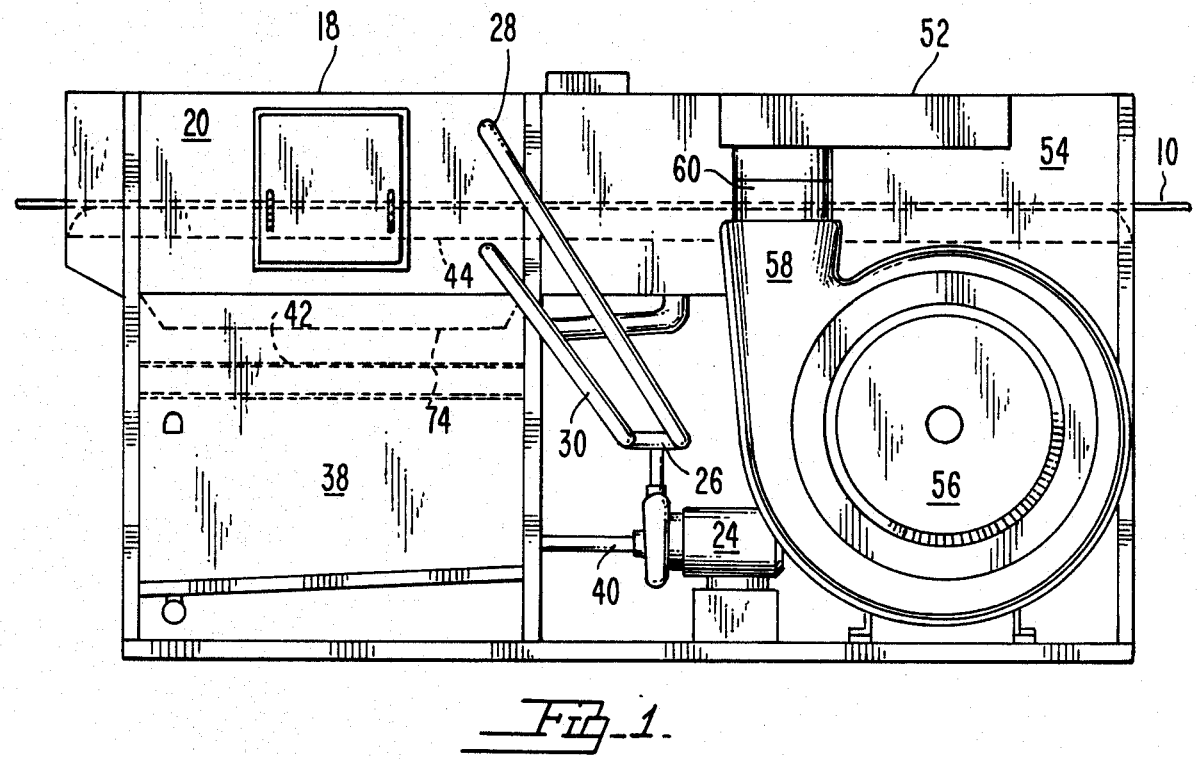
FIG. 1 is a front plan view showing an embodiment of the apparatus for conveying a washing means therefore of the present invention.

To provide full and complete washing, preferably the upper nozzles are divided into a first upper nozzle section 66 and a second upper nozzle section 68. The first upper nozzle section 66 as represented by the two upper nozzles on the left most portion of FIG. 2 include deflector means 76 for directing the flow of spray cleaning solution both downwardly and downstream with respect to the direction of movement of the conveying belt. In a similar but opposite fashion, the second upper nozzle section 68 shown by the two upper nozzles on the right hand portion of FIG. 1, direct the sprayer cleaning solution not only downwardly but upstream with respect to the direction of movement of the conveying belt 10 and articles 11 carried thereon. In this manner, the cleaning of the front and back of the articles traveling along the conveying belt and on the conveying belt itself is more efficiently achieved.

Figure 2:
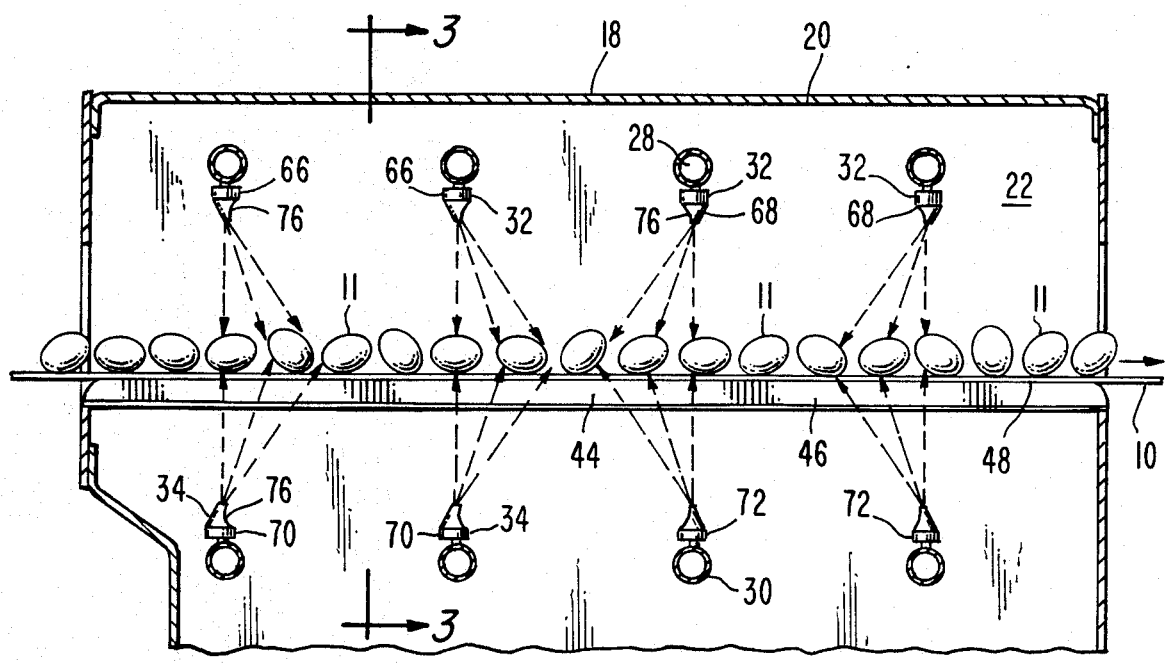
FIG. 2 is a longitudinal cross sectional view of an embodiment of the wash station of the present invention along lines 2—2 of FIG. 3.
Figure 3:
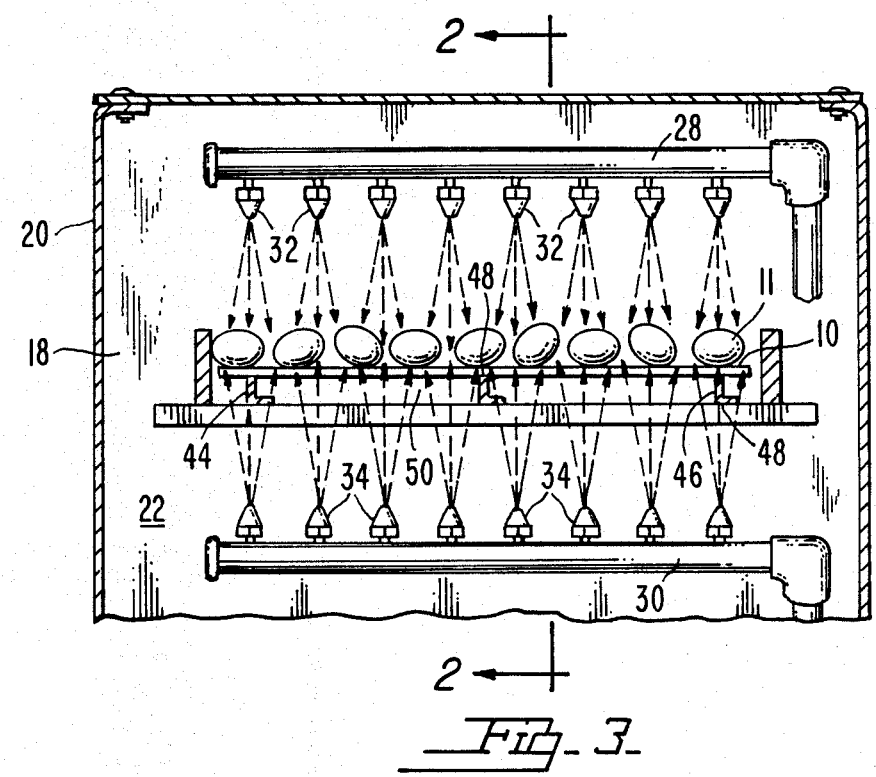
FIG. 3 is a cross sectional lateral view of the embodiment showing FIG. 1 along lines 3—3 as shown in FIG. 2.

The bottom or lower nozzles are also preferably divided into a first lower nozzle section 70 and a second lower nozzle section 72. As shown in FIG. 2, first lower nozzle section 70 is represented by the two lower left most nozzles. This nozzle section 70 may include deflector means 76 thereon for urging the cleaning solution both upwardly and downstream with respect to the direction of movement of conveying belt 10 to thereby effectively wash and clean the lower and rear lower quarter portions of conveying belt 10 and articles 11 being carried thereon. In a similar manner, the second lower nozzle section 72 is represented in FIG. 2 by the two lower right most nozzles. These nozzles include deflector means 76 for directing cleaning solution both upwardly and upstream with respect to the direction of movement of conveying belt 10 to thereby more effectively wash the bottom and front lower quarter section of the members of conveying belt 10 and of any articles 11 which may be carried thereon.

In this manner, the present invention provides a washing system for the washing of a conveying belt itself which can be utilized with a significantly convoluted configuration of a conveying belt which heretofore has been found to be extremely difficult to clean. Also, the present invention can be utilized as a prewashing step for articles such as eggs immediately before removal from a poultry house.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. An apparatus for conveying and washing means therefor, comprising:
 (a) a conveying belt means comprising a plurality of wire members interlocking with and movable with respect to one another, each said wire member including:
   (1) a central section extending approximately straight laterially across said conveying means prependicularly with respect to the direction of movement of said conveying means,
   (2) interlocking end means adapted to movably grip adjacent wire members to maintain a spatial distance between central sections of adjacent wire members and allow pivotal movement between adjacent wire members for flexibility;
 (b) a wash station for cleaning of said conveying belt means and articles randomly positioned thereon comprising:
   (1) a wash housing means enclosing a portion of said conveying belt means and defining a washing chamber therein for enclosing and gathering cleaning solution sprayed toward said conveying belt means, said wash housing means defining an outlet means in the lower section thereof to allow used cleaning solution to exit from said wash housing means;

(2) a pump means for pumping cleaning solution into said washing chamber;

(3) an intake manifold means for receiving cleaning solution under pressure from said pump means and delivering same into an area adjacent to said conveying belt means, said intake manifold means including an upper manifold section extending across the upper surface of said conveying belt means, said upper manifold section and said lower manifold section being in fluid flow communication with respect to said pump means to receive cleaning fluid therefrom;

(4) a plurality of upper nozzles mounted in said upper manifold section and extending downwardly therefrom, said upper nozzles being in fluid flow communication with respect to the cleaning solution within said upper manifold section for dispensing same in a downwardly direction onto said conveying belt means and any articles randomly positioned thereon, said upper nozzles including a first upper nozzle section and a second upper nozzle section, said first upper nozzle section including first upper nozzle and first upper deflector means thereadjacent being oriented downstream with respect to the direction of movement of said conveyor means to facilitate cleaning of the upper and rearmost areas of said conveyor belt means and any articles randomly positioned thereon, said second upper nozzle section including second upper nozzles and second upper deflector means thereadjacent being oriented upstream with respect to the direction of movement of said conveyor means to facilitate cleaning of the upper and frontmost areas of said conveyor belt means and any articles randomly positioned thereon;

(5) a plurality of lower nozzles mounted in said lower manifold section and extending upwardly therefrom, said lower nozzles being in fluid flow communication with respect to the cleaning solution within said lower manifold section for dispensing same in an upwardly direction onto said conveying belt means and any articles randomly positioned thereon, said lower nozzles including a first lower nozzle section and a second lower nozzle section, said first lower nozzle section including first lower nozzles and first lower deflector means thereadjacent being oriented downstream with respect to the direction of movement of said conveyor means to facilitate cleaning of the lower and rearmost areas of said conveyor belt means and any articles randomly positioned thereon, said second lower nozzle section including second lower nozzles and second lower deflector means thereadjacent being oriented upstream with respect to the direction of movement of said conveyor means to facilitate the cleaning of the lower and frontmost areas of said conveyor belt means and any articles randomly positioned thereon;

(6) a drive means for operatively controlling said pump means;

(7) a tank positioned below said outlet means of said wash housing means to receive and gather used cleaning solution therefrom;

(8) a return line in fluid flow communication with respect to said tank means and with respect to said pump means for supplying cleaning solution to said pump;

(9) a support means mounted within said wash housing means for supporting and guiding said conveying belt means while traveling through said wash station, said support means defining open channels through which cleaning solution can be directed by said lower nozzles for cleaning of the bottom of said conveying belt means and the bottom of any articles randomly positioned thereon;

(c) a drying station positioned downstream from said wash station and enclosing said conveying belt means traveling therethrough, said drying station including (1) a drying housing means enclosing said conveying belt means;

(2) a blower means supplying forced air for drying of said conveying belt means and any articles randomly positioned thereon;

(3) an air manifold means for receiving forced air from said blower means and communicating same into said drying housing means adjacent to said conveying belt means; and (4) and air dispensing means positioned within said drying housing means and in fluid flow communication with respect to said air manifold means for delivering forced air for drying onto said conveying belt means and any articles randomly positioned thereon.

2. An apparatus for conveying having washing means as defined in claim 1 wherein said wash station further includes a filter means positioned between said outlet means of said wash housing means and said tank means to filter the cleaning solution prior to being drawn into said return line for reuse.

3. The apparatus as defined in claim 1 wherein said interlocking end means includes a wire loop means defining an opening therethrough into which an adjacent wire means extends for providing of said interlocking means.

4. The apparatus as defined in claim 1 wherein said interlocking end means maintains said central section of said wire members at a spatial distance of approximately one inch from one another.

5. The apparatus as defined in claim 1 wherein said support means comprises a plurality of vertical plates including upper edges for supporting said conveying belt means and being spatially disposed with respect to one another for defining said open channels therebetween.

6. The apparatus as defined in claim 5 wherein said support means comprise three of said vertical plates.

7. An apparatus for conveying and washing means therefor, comprising:

(a) a conveying belt means comprising a plurality of wire members interlocking with and movable with respect to one another, each said wire member including:

(1) a central section extending approximately straight laterally across said conveying means perpendicularly with respect to the direction of movement of said conveying means;

(2) interlocking end means adapted to movably grip adjacent wire members to maintain a spatial distance between central sections of adjacent wire members of approximately one inch and allow pivotal movement between adjacent wire members for flexibility, said interlocking end means including a wire loop means defining an opening therethrough into which an adjacent wire means extends for providing of said interlocking means;

(b) a wash station for cleaning of said conveying belt means and articles randomly positioned thereon comprising:
(1) a wash housing means enclosing a portion of said conveying belt means and defining a washing chamber therein for enclosing and gathering cleaning solution sprayed toward said conveying belt means, said wash housing means defining an outlet means in the lower section thereof to allow used cleaning solution to exit from said wash housing means;
(2) a pump means for pumping cleaning solution into said washing chamber;
(3) an intake manifold means for receiving cleaning solution under pressure from said pump means and delivering same into an area adjacent to said conveying belt means, said intake manifold means including an upper manifold section extending across the upper surface of said conveying belt means and a lower manifold section extending across the under surface of said conveying belt means, said upper manifold section and said lower manifold section being in fluid flow communication with respect to said pump means to receive cleaning fluid therefrom;
(4) a plurality of upper nozzles mounted in said upper manifold section and extending downwardly therefrom, said upper nozzles being in fluid flow communication with respect to the cleaning solution within said upper manifold section for dispensing same in a downwardly direction onto said conveying belt means and any articles randomly positioned thereon, said upper nozzles including deflector means thereon for controlling the flow of cleaning solution, said upper nozzles including a first upper nozzle section and a second upper nozzle section, said first upper nozzle section having upper nozzles with said deflector means thereof oriented facing downstream with respect to the direction of movement of said conveyor means to facilitate cleaning of the bottom and rearmost areas of said conveyor belt means and any articles randomly positioned thereon, said second upper nozzle section having upper nozzles with said deflector means thereof oriented facing upstream with respect to the direction of movement of said conveyor means to facilitate cleaning of the bottom and frontmost areas of said conveyor belt means and any articles randomly positioned thereon;
(5) a plurality of lower nozzles mounted in said lower manifold section and extending upwardly therefrom, said lower nozzles being in fluid flow communication with respect to the cleaning solution within said lower manifold section for dispensing same in an upwardly direction onto said conveying belt means and any articles randomly positioned thereon, said lower nozzle including deflector means thereon for controlling flow of cleaning solution, said lower nozzles including a first lower nozzle section and a second lower nozzle section, said first lower nozzle section having lower nozzles with said deflector means nozzles oriented facing down-stream with respect to the direction of movement of said conveyor means to facilitate cleaning of the bottom and rearmost areas of said conveyor belt means and any articles randomly positioned thereon, said second lower nozzle section having lower nozzles with said deflector means thereof oriented facing upstream with respect to the direction of movement of said conveyor means to facilitate cleaning of the bottom and frontmost areas of said conveyor belt means and any articles randomly positioned thereon;
(6) a drive means for operatively controlling said pump means;
(7) a tank means positioned below said outlet means of said wash housing means to receive and gather used cleaning solution therefrom;
(8) a return line in fluid flow communication with respect to said tank means and with respect to said pump means for supplying cleaning solution to said pump;
(9) a support means mounted within said wash housing means for supporting and guiding said conveying belt means while traveling through said wash station, said support means defining open channels through which cleaning solution can be directed by said lower nozzles for cleaning of the bottom of said conveying belt means and the bottoms of any articles randomly positioned thereon, said support means comprising three vertically extending plates including upper edges for supporting said conveying belt means and being spatially disposed with respect to one another for defining said open channels therebetween;
(10) a filter means positioned between said outlet means of said wash housing means and said tank means to filter the cleaning solution prior to being drawn into said return lines for reuse;

(c) a drying station positioned downstream from said wash station and enclosing said conveying belt means traveling therethrough, said drying station including:
(1) a drying housing means enclosing said conveying belt means;
(2) a blower means supplying forced air for drying of said conveying belt means and any articles randomly positioned thereon;
(3) an air manifold means for receiving forced air from said blower means and communicating same into said drying housing means adjacent to said conveying belt means; and
(4) an air dispensing means positioned within said drying housing means and in fluid flow communication with respect to said air manifold means for delivering forced air for drying into said conveying belt means and any articles randomly positioned thereon.

* * * * *